US 6,696,768 B1

(12) United States Patent
Barat et al.

(10) Patent No.: US 6,696,768 B1
(45) Date of Patent: Feb. 24, 2004

(54) ARRANGEMENT OF EQUIPMENT FOR A MOTOR VEHICLE

(75) Inventors: Didier Barat, Meudon (FR); Andrew Nash, Clairfontaine (FR)

(73) Assignees: Valeo, Paris (FR); Visteon Systems Interieurs, La Defense Cedex (FR)

( * ) Notice: Subject to any disclaimer, the term of this patent is extended or adjusted under 35 U.S.C. 154(b) by 0 days.

(21) Appl. No.: 09/959,492

(22) PCT Filed: Apr. 28, 2000

(86) PCT No.: PCT/FR00/01146

§ 371 (c)(1),
(2), (4) Date: Jan. 28, 2002

(87) PCT Pub. No.: WO00/66398

PCT Pub. Date: Nov. 9, 2000

(30) Foreign Application Priority Data

Apr. 28, 1999 (FR) .............................................. 99 05565

(51) Int. Cl.⁷ ............................................... B60R 16/02
(52) U.S. Cl. ...................................... 307/10.1; 361/735
(58) Field of Search .......................... 307/10.1; 361/735

(56) References Cited

U.S. PATENT DOCUMENTS

| 4,731,769 | A | | 3/1988 | Schaefer et al. | |
| 6,093,977 | A | * | 7/2000 | Fujita et al. | 307/10.1 |
| 6,119,060 | A | * | 9/2000 | Takayama et al. | 307/9.1 |
| 6,181,563 | B1 | * | 1/2001 | Shimbo et al. | 307/10.1 |
| 6,344,801 | B1 | * | 2/2002 | Aoki et al. | 307/10.1 |
| 6,388,881 | B2 | * | 5/2002 | Yamauchi et al. | 307/10.1 |

FOREIGN PATENT DOCUMENTS

| EP | 0 057 892 A2 | 8/1982 |
| EP | 0 889 304 A1 | 1/1999 |
| JP | 09207626 | 8/1997 |

* cited by examiner

*Primary Examiner*—Brian Sircus
*Assistant Examiner*—Roberto J. Rios
(74) *Attorney, Agent, or Firm*—Young & Thompson

(57) ABSTRACT

An arrangement of equipment for a motor vehicle is designed to perform a variable number of functions such as to assist and/or enhance driving. The arrangement comprises at least one plurality of electronic components based equipment elements (1). According to the invention, remote processing members which are common to the entire set of equipment elements are provided. The electronic components have specific functions according to each equipment element and act as additional processing members, whereby it is possible for each equipment element to carry out one or several given functions of the arrangement by combining them with the common processing members. The invention also relate to a dashboard for a motor vehicle which is provided with the arrangement of equipment.

9 Claims, 3 Drawing Sheets

ARRANGEMENT OF EQUIPMENT FOR A MOTOR VEHICLE

BACKGROUND OF THE INVENTION

The invention relates to an arrangement of apparatus for a motor vehicle which is especially intended to assist with driving and/or to make it more pleasant, as well as to a dashboard for a motor vehicle, featuring such an arrangement.

In the motor-vehicle field, at the present time, dashboards are known featuring, in the central part, on the front face, one or more housings for accommodating equipment elements such as a car radio, a cassette or compact-disc player, a navigation system or other systems.

These various pieces of equipment are installed optionally, either on the basis of the equipment fit given to the vehicle when it is manufactured or, during or after purchase, on the basis of the wishes of the user.

One of the first drawbacks of such optional equipment elements is that they present redundancies and that the said elements are all equipped with their own power supply, with their own control panel and/or their own display system.

This therefore multiplies the number of components necessary to operate them and increases their bulk, and consequently limits the number of optional equipment elements capable of being used.

Moreover, in order to rationalise their connections, connection boxes are nowadays used, which are pre-installed for a maximum number of optional equipment elements. These therefore exhibit a relatively cumbersome structure, although they are usually only partially used or are even wholly unused in certain instances of bottom-of-the-range vehicles.

SUMMARY OF THE INVENTION

The object of the present invention is to propose an arrangement of apparatus for a motor vehicle as well as a dashboard featuring such an arrangement which overcomes the abovementioned drawbacks.

One of the objects of the present invention is to provide an arrangement of apparatus making it possible to avoid the functional and/or hardware redundancies among the equipment elements which form part of it.

Another object of the present invention is to propose an arrangement of apparatus for a motor vehicle and a dashboard for a motor vehicle featuring such an arrangement the bulk and/or the structure of which are reduced.

Another object of the present invention is to propose an arrangement of apparatus for a motor vehicle and a dashboard for a motor vehicle featuring such an arrangement in which the energy supply and/or the data distribution/acquisition for the said equipment elements is optimised.

One advantage of the present invention is that of proposing a solution which makes it possible to arrange equipment elements the number and the nature of which can easily be upgraded, either during the construction of the vehicle or when the vehicle is made available to the user upon sale, or in the course of its life after sale.

Other objects and advantages of the invention will emerge in the course of the description which will follow, which is given only by way of indication and which is not for the purpose of limiting it.

The invention first of all relates to an arrangement of apparatus for a motor vehicle, which is intended to perform a variable number of functions, especially to assist with driving and/or to make it more pleasant, comprising at least a plurality of equipment elements based on electronic components and processing means, characterised in that the said processing means are intended to be remote and to be common for the set of the said equipment elements, and the said electronic components, intended to be functionally specific from one equipment element to the other, constitute additional processing means in order, in combination with the said common remote processing means, to allow the implementation of one or more given functions of the said arrangement, by each of the said equipment elements.

The invention moreover relates to an arrangement of electronic apparatus for a motor vehicle, which is intended to allow a variable number of functions to be carried out, especially to assist with driving and/or to make it more pleasant, comprising at least a plurality of equipment elements based on electronic components, characterised in that at least one of the said equipment elements, called first element, comprises connection means for the energy supply and/or the distribution/acquisition of data for the said components, comprising at least first plug-in means, intended to be linked, directly or otherwise, to one or more energy-supply and/or data distribution/acquisition circuits, and of second plug-in means, intended to make it possible to link another equipment element to the said circuit by way of the said first equipment element.

The invention also relates to a dashboard for a motor vehicle equipped with such an arrangement of apparatus.

BRIEF DESCRIPTION OF THE DRAWINGS

The invention will be better understood on reading the following description, accompanied by the drawings in the annex which form an integral part of it, and among which.

DETAILED DESCRIPTION OF THE PREFERRED EMBODIMENTS

The invention first of all relates to an arrangement of apparatus for a motor vehicle, which is intended to allow a variable number of functions to be carried out, especially to assist with driving and/or to make it more pleasant.

Figure 1:
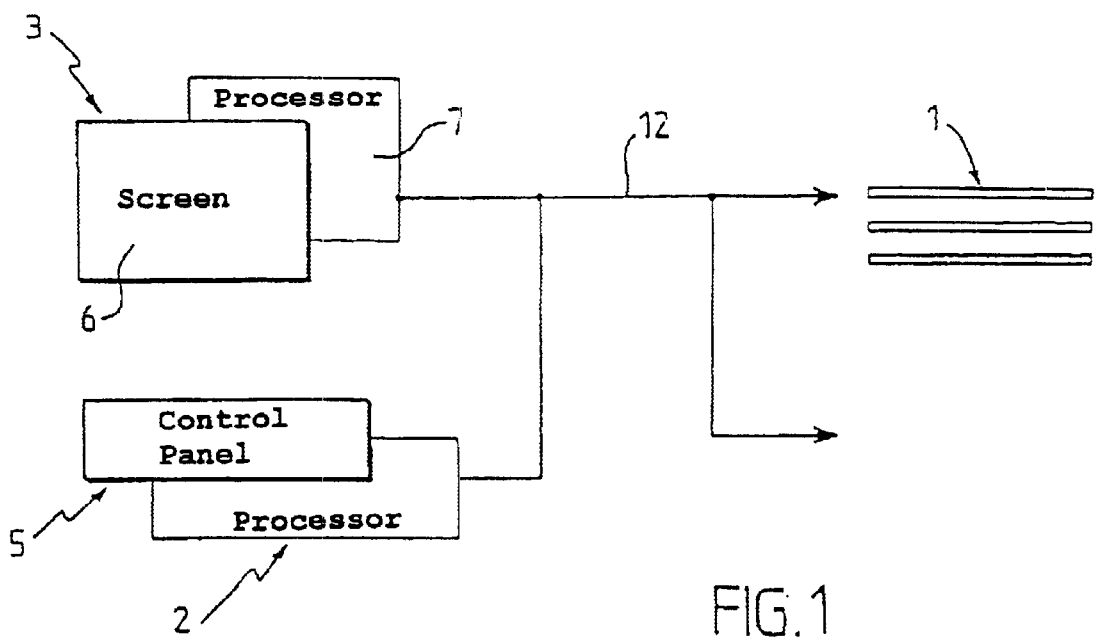
FIG. 1 diagrammatically illustrates an example embodiment of the arrangement of apparatus in accordance with the invention.

As illustrated in FIG. 1, the said arrangement comprises a plurality of equipment elements 1 based on electronic components. These are, particularly, interior equipment elements of an optional nature such as electronics cards for a car radio, cassette or compact-disc player, navigation or other systems, for example.

By "optional" it is understood that a given equipment element may or may not form part of the apparatus arrangement in accordance with the invention, either on the basis of the choices made where it is manufactured, or on the basis of the wishes of the user, at the time of or after sale. In contrast, equipment elements such as a revolution counter, a speedometer and/or a safety indicator could not be considered as "optional".

The apparatus arrangement in accordance with the invention further comprises processing means 2. According to the invention, the said processing means are provided remotely and are common for the set of the said equipment elements.

Furthermore, the said electronic components, intended to be functionally specific from one equipment element to the other, constitute additional processing means in order, in combination with the said common processing means, to allow the implementation of one or more given functions of the said arrangement, by each of the said equipment elements.

Thus redundancies between components are avoided, and the size of the equipment elements 1 is limited, these elements featuring only the components which are necessary to implement their own function. Their control, and the display of the operation, in particular, can be carried out elsewhere.

The said components are, for example, designed to be passive and the operation of the said elements is entirely dependent on the said processing means.

The electronic components which might be found within the said equipment elements 1 will thus especially consist of random-access or permanent memory, of connectors able to receive antennae or other connectors, possibly mounted on an electronics card, microprocessor and/or microcontroller means, on the other hand, being provided within the common processing means 2.

The arrangement in accordance with the invention further includes, for example, a common control panel 5 and/or common means 3 for remote display of the operation of the said equipment element or elements 1.

The said processing means 2 are intended, especially, to be able to allow the handling of a menu featuring pre-recorded functions for the use of one or more of the said equipment elements 1, the said control panel 5 being designed to be able to allow the menu to be activated in order to implement one or more said functions.

By virtue of such a menu, it is thus possible to facilitate the upgrading of the level of equipment of the apparatus arrangement in accordance with the invention, each element, after its installation, being capable of being used from the said processing means 2.

The said display means 3 are designed to be able, for example, to allow at least the viewing of the said menu as well as, especially, the status of the functional commands for the said equipment elements 1.

These consist, for example, of a screen 6 and of means 7 for processing the information to be displayed.

The said arrangement may furthermore, if appropriate, comprise common means for energy supply to the said equipment element or elements 1. Thus takes the form, especially, of a stabilised power supply, protected power supply and/or others. These various components are provided, for example, within the said common processing means 2.

The said arrangement of apparatus further especially comprises a circuit 12, able to allow the distribution of energy and the information, linking at least the said equipment element or elements 1 and/or the said processing means 2, 7.

This takes the form, for example, of a set of cables, linked to an electrical earth, making it possible to conduct the electrical power necessary for the operation of the equipment elements 1, of analog links allowing the transfer of sound and of images, especially of the RGB5-standard type, of digital links allowing the transfer of addressed instructions, of the CAN type, or especially USB serial links, of digital links for allowing for the transfer of application data, of the IEEE 1394 type especially, and/or others.

Figure 2:
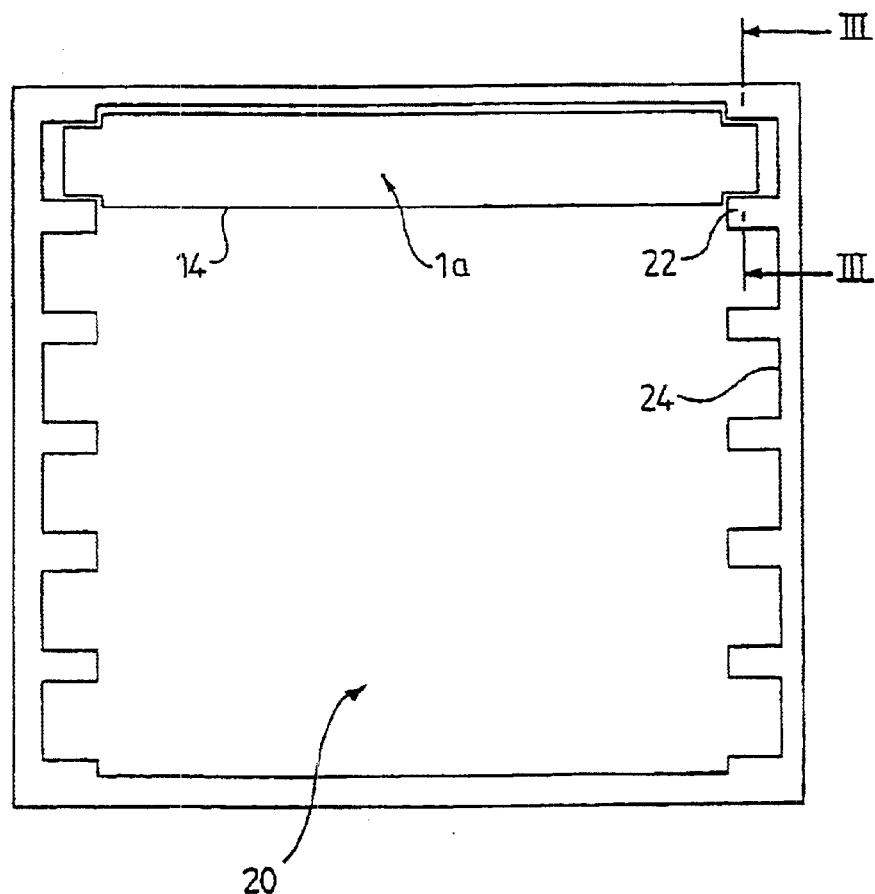
FIG. 2 illustrates, in front view, an example embodiment of a part of the dashboard in accordance with the invention, accommodating equipment elements of the apparatus arrangement in accordance with the invention, in one of their possible embodiments.
Figure 3:
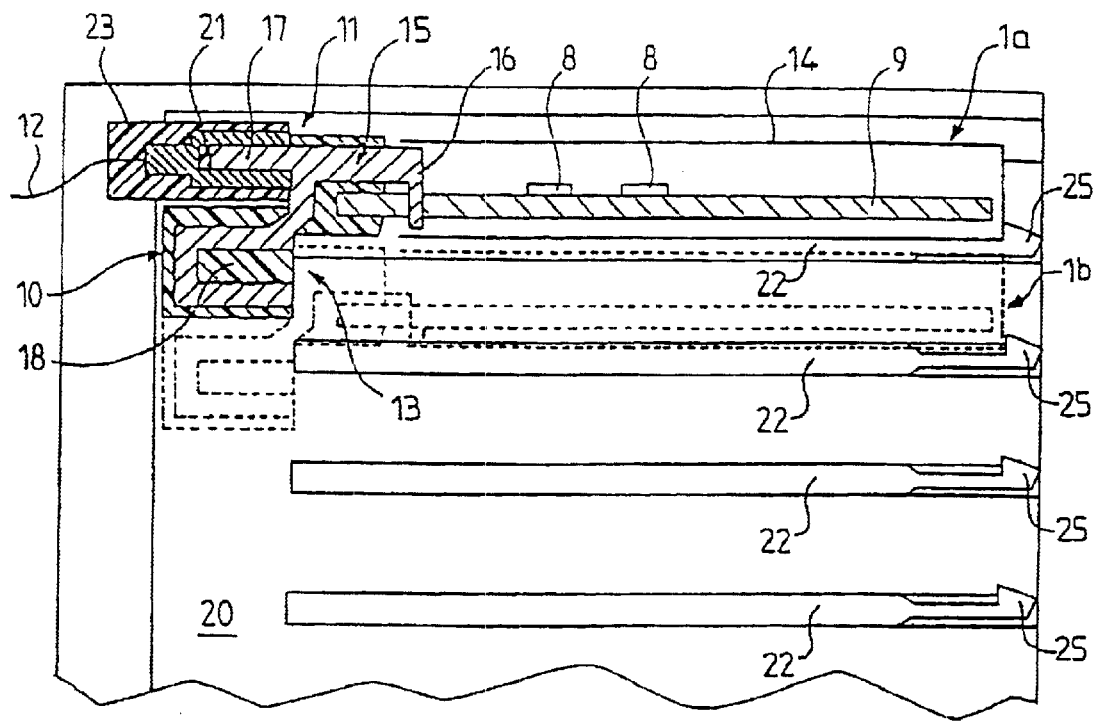
FIG. 3 is a sectional view along the line III—III represented in the preceding FIG. 2.
Figure 4:
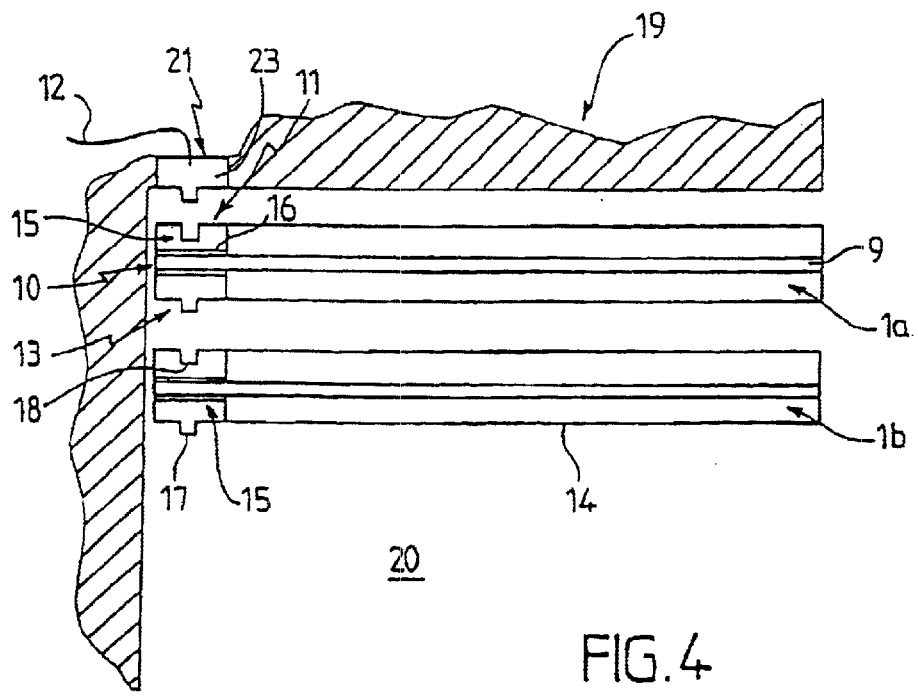
FIG. 4 illustrates a variant embodiment of the part of the dashboard represented in the preceding FIG. 3, FIG. 5 more particularly illustrates a part of the preceding FIG. 3.

As illustrated in FIGS. 2 to 4, according to one variant of the invention, possibly complementary, at least one of the said equipment elements, called first element 1a, comprises connection means 10 for the energy supply and/or the distribution/acquisition of data for the said components, the latter being referenced 8 in FIG. 3.

According to the invention, the connection means 10 of the said first equipment element 1a consist at least of first plug-in means 11, which are intended to be linked, directly or otherwise, to one or more energy supply and/or data distribution/acquisition circuits 12, especially digital circuits, and of second plug-in means 13, intended to make it possible to link another equipment element 1b to the said circuit 12 by way of the said first equipment element 1a.

The said other equipment element 1b could possibly feature connection means 10 which are identical to the said first equipment element 1a, and so on.

Such equipment elements in accordance with the invention consist, for example, of a casing 14 within which are provided the said electronic components 8, possibly mounted on an electronics card 9. The said connection means 10 especially comprise, furthermore, a circuit 15, called internal circuit, for energy supply and/or for data distribution/acquisition, linking the said first and second plug-in means 11, 13, the said internal circuit being intended functionally and/or structurally to extend the power-supply circuit 12 to which the said first plug-in means 11 are linked.

The said circuit 15 is, for example, cut out and overmoulded in a plastic material.

The said internal power-supply circuit 15 especially features at least one connector 16 for the energy supply and/or the distribution/acquisition of data for the said components 8. It takes the form, for example, of a connector allowing the electronics cards 9 to be plugged in.

The said first and second plug-in means 11, 13, consist, especially, respectively of male and female connectors 17, 18 or vice versa.

According to a first embodiment, illustrated in FIG. 3, they allow plugging-in, in an insertion direction substantially parallel to the plane of the casing 14. In another embodiment, illustrated in FIG. 4, they allow plugging-in in an insertion direction orthogonal to the preceding one.

These various layouts advantageously make it possible to lighten the structure of the said arrangement and allow a modular mode of connection.

That being so, the invention also relates to a dashboard 19 for a motor vehicle featuring such an arrangement of apparatus.

Figure 5:
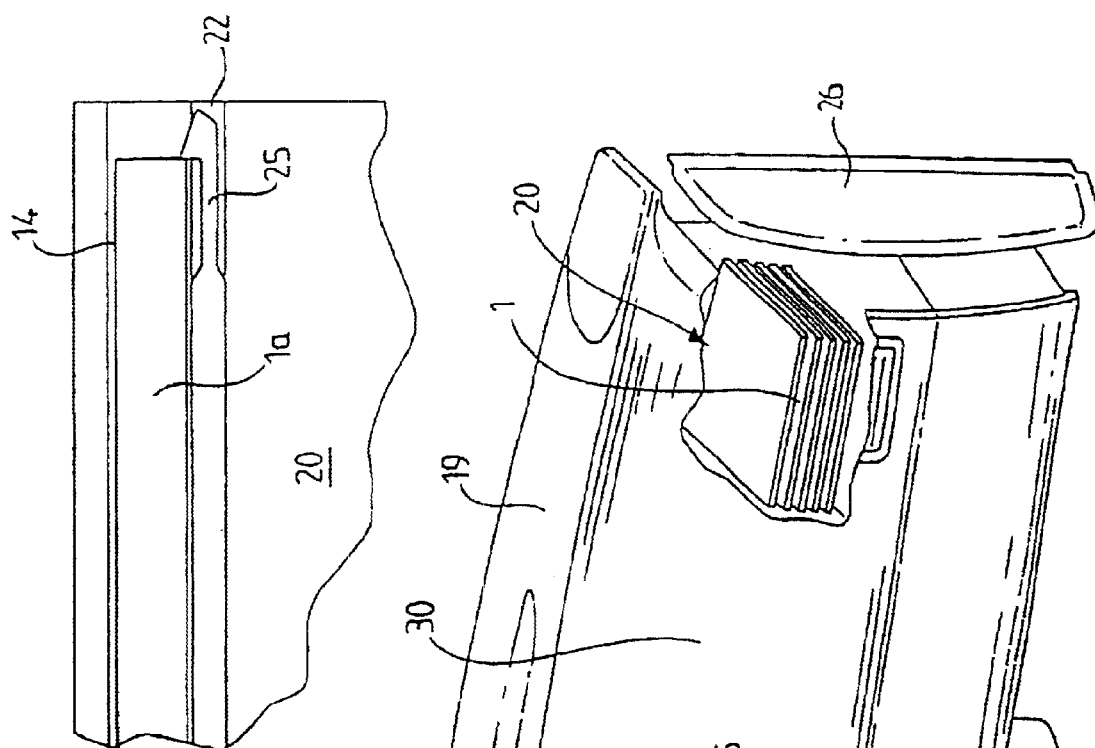
Figure 6:
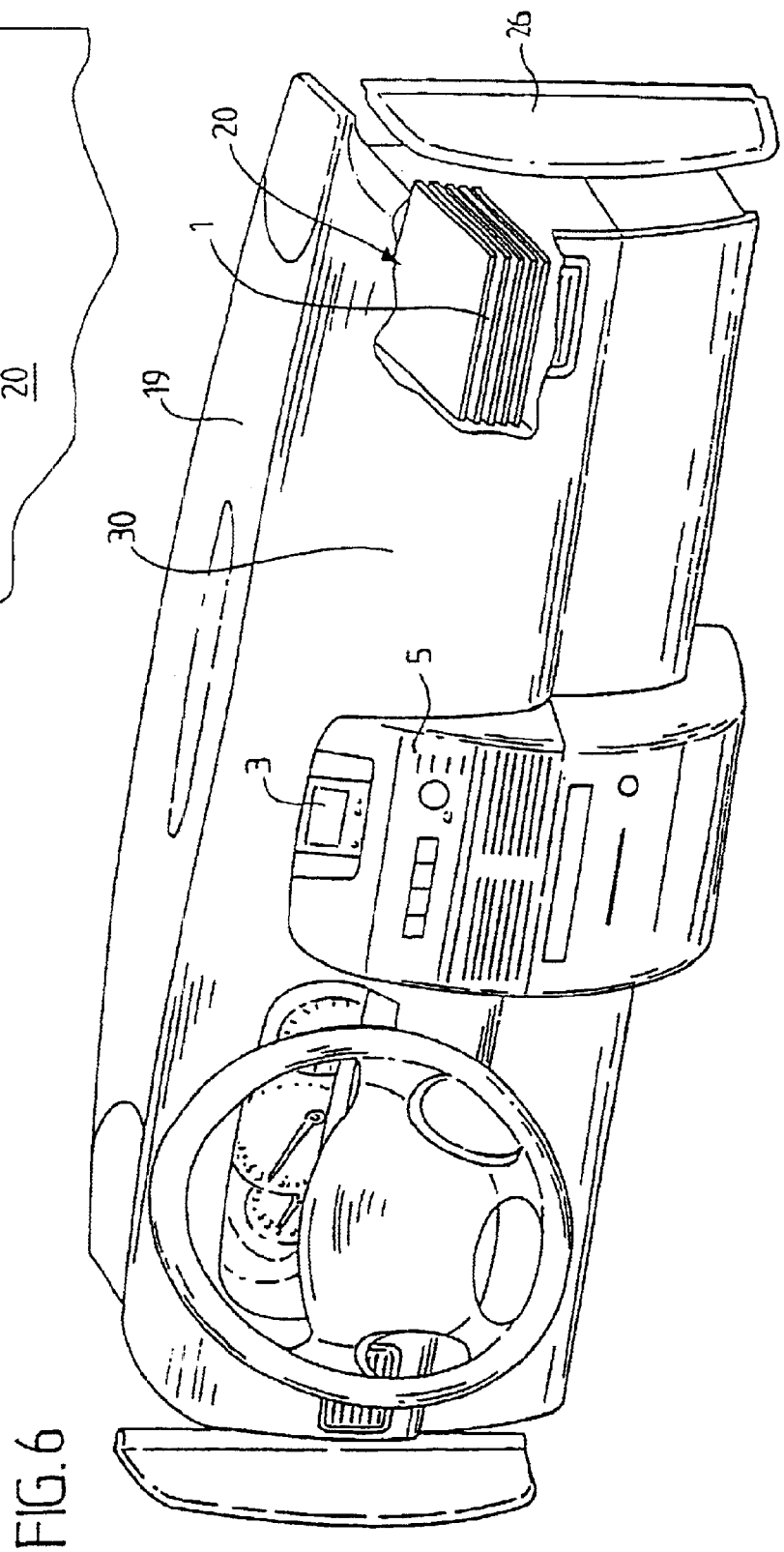
FIG. 6 illustrates, in perspective, an example embodiment of the dashboard in accordance with the invention.

As illustrated in FIGS. 2, 5 and 6, the said dashboard is equipped, for example, with a housing 20 in which the said equipment elements 1 are mounted removably and/or are accessible through a hatch 26, provided in the region of a panel 30 constituting a cover for the said dashboard.

The housing 20 is thus situated in the dashboard 19, especially, at a place which is accessible from the outside, and it is possible to add and/or withdraw elements 1 from the housing 20, without having to carry out complete dismantling.

In the example represented in FIG. 6, the hatch 26 is situated on the side of the dashboard 19, and the housing 20 is situated in immediate proximity. It is therefore possible to gain access to it, vehicle stopped, from the side, door open.

Referring again to FIGS. 2 to 5, it is observed that the said housing 20 is defined, for example, by a casing featuring, on the one hand, plug-in means 21 for one and only one said equipment element on the said energy-supply and/or data distribution/acquisition circuits 12, provided within the said dashboard 19 and/or, on the other hand, guidance means 22 for the contiguous stacking of the said equipment elements, the said stacking taking place at least via their first and/or second plug-in means 11, 13.

The said plug-in means 21 provided within the said housing 20 consist, for example, of a connector 23. It is thus possible to make available a housing 20 equipped with a single connector in order to accommodate all the equipment elements 1a, 1b, which are then plugged into one another. It is then no longer necessary to rely on the previous connection boxes on a backplane of the prior art.

The said guidance means consist, especially, of the walls 24 of the housing 20, designed to be able, at least partially, to match the contour of the said equipment elements 1a, 1b, for example the contour of their casing 14.

The guidance means 22 may furthermore, if appropriate include immobilisation means 25, illustrated in FIGS. 3 and 5, such as lugs formed in the guidance means 22. These means 25 may, for example, be reversible in order to allow dismantling of the equipment elements 1.

Naturally, other embodiments, within the scope of the person skilled in the art, could have been envisaged without in any way departing from the context of the invention.

What is claimed is:

1. A dashboard for a motor vehicle comprising a housing; a plurality of equipment elements based on electronic components removably mounted in said housing; a processing means remote from and common for said plural equipment elements; and an access hatch in said dashboard allowing access to said equipment elements; wherein each said electronic component is functionally specific to each corresponding said equipment element, and include additional processing means in order to allow each of said plural equipment to implement one or more given functions of said arrangement, and wherein said plural equipment elements are accessible through said hatch.

2. The dashboard according to claim 1, wherein said hatch and said housing are at one longitudinal extremity of said dashboard.

3. Arrangement according to claim 1, wherein said components are designed to be passive, and the operation of said elements is entirely dependent on said processing means.

4. Arrangement according to claim 1, further including a common control panel for display of the operation of said equipment elements.

5. Arrangement according to claim 1, wherein at least one of said equipment elements comprises connection means for one of an energy supply and distribution/acquisition of data for said components, and comprises at least a first plug-in member linked to at least one of an energy-supply and a data distribution/acquisition circuit, and a second plug-in member that make it possible to link another equipment element to said circuit by way of said first equipment element.

6. Arrangement according to claim 5, wherein said connection means further comprises an internal circuit for one of energy supply and data distribution/acquisition, linking said first and second plug-in members so as to extend the power-supply circuit to which said first plug-in member is linked.

7. Arrangement according to claim 6, wherein said internal circuit has at least one connector for one of the energy supply and the distribution/acquisition of data for said electronic components.

8. Arrangement according to claim 5, wherein said first and second plug-in members consist respectively of male and female connectors.

9. Arrangement according to claim 5, wherein said first and second plug-in members are respective female and male connectors.

* * * * *